United States Patent [19]

Haun, Jr. et al.

[11] B 3,992,681

[45] Nov. 16, 1976

[54] METHOD AND MEANS FOR CONTROLLING POPULATION INVERSION AND ELECTRONICALLY SCANNING SOLID STATE LASER OUTPUT DEFLECTIONS

[75] Inventors: Robert D. Haun, Jr., Pittsburgh; John D. Feichtner, Murrysville, both of Pa.

[73] Assignee: Westinghouse Electric Corporation, Pittsburgh, Pa.

[22] Filed: Aug. 1, 1973

[21] Appl. No.: 384,654

[44] Published under the second Trial Voluntary Protest Program on February 24, 1976 as document No. B 384,654.

[52] U.S. Cl. .................. 331/94.5 M; 331/94.5 P; 331/94.5 K
[51] Int. Cl.² .................. H01S 3/10; H01S 3/094
[58] Field of Search .................. 331/94.5; 330/4.3

[56] References Cited
UNITED STATES PATENTS

| | | | |
|---|---|---|---|
| 3,178,657 | 4/1965 | Morse | 331/94.5 |
| 3,292,103 | 12/1966 | Soules et al. | 331/94.5 |
| 3,439,169 | 4/1969 | Lynch | 331/94.5 |
| 3,774,121 | 11/1973 | Ashkin et al. | 331/94.5 |

OTHER PUBLICATIONS

Birnbaum et al., Proceedings of the IEEE, June 1968, pp. 1096–1097.

Dienes et al., IEEE J. Quantum Electronics, vol. 8, No. 3.

Primary Examiner—Robert J. Webster
Attorney, Agent, or Firm—R. M. Trepp

[57] ABSTRACT

A method for controlling the population inversion in a solid state laser material by optically pumping the material with a laser beam having a wavelength corresponding to the absorption band of the laser material and the output of which is spatially and temporally modulated. Spatial and temporal modulations of the population inversion in the pumped material are achieved by means of a two-dimensional spatial modulator positioned between the pump laser beam and the pumped laser material, the modulation being thermo-optically controlled by a scanning electron or laser beam or electro-optically controlled by a scanning electron beam or acousto-optically controlled by a two-dimensional acousto-optical modulator. Utilization of a lens between the spatial modulator and the optical cavity of the laser material permits electronic deflection of the output from said laser material by focusing the beam transmitted through said spatial modulator.

12 Claims, 4 Drawing Figures

METHOD AND MEANS FOR CONTROLLING POPULATION INVERSION AND ELECTRONICALLY SCANNING SOLID STATE LASER OUTPUT DEFLECTIONS

FIELD OF THE INVENTION

The present invention relates to a method for spatially and temporally controlling population inversion and for scanning electronically said controlled population inversions in solid state lasers.

BACKGROUND OF THE INVENTION

In many applications such as scanned active imaging systems, optical radar, and the like, it is desirable to electronically change the direction of the laser output through a range of several degrees. Methods previously used to achieve the required deflection include mounting small mirrors on electrically driven tuning forks operating in a torsional mode. The deflected output beam from the laser always oscillates in the same direction. Another method includes electronically modulating the end reflectivity of a laser resonator. While both of these methods provide for output deflection scanning, both have inherent limitations and disadvantages.

With electrically driven tuning forks, deflection is limited in the variation of the driving frequency because of the required resonance with the mechanical frequency of the tuning fork. Also, this method does not provide random access to a predetermined direction. The latter method, on the other hand, while providing random access and a large range of scanning frequencies, requires large changes in reflectivity and high maximum reflectivity must be achieved.

It is an object of the present invention to provide a method which permits a high scanning frequency, random access and a relatively simple variation of scanning frequency. It is a further object of the present invention to provide a method for controlling the population inversion of a solid state laser to increase the output power subject to scanning.

SUMMARY OF THE INVENTION

Generically, the present invention provides a method for optically pumping a solid state laser material, such as, for example, Nd:FAP and Nd:YAG, by means of a pumping laser having an output, the wavelength of which corresponds to the pump band of the solid state laser material. The output of the laser material may be controlled by spatial and temporal control of the population inversion. For example, in a specific embodiment of the present invention, a solid state laser material such as Nd:FAP is pumped by means of an argon ion laser. The radiation in the bands 5000–5500A, 5600–6100A and 7200–8900A are absorbed by the $Nd^{3+}$ ions which will provide fluorescence at 1.06 microns. If the pump radiation is intense enough, population inversion and gain results. The spatial and temporal characteristics of the population inversion in the solid state pumped material depends upon those of the pumping radiation, as modified by the spatial cross-relaxation, if any, among excited ions in the pumped material.

Thus, in the present invention solid state lasing material is positioned between a pair of output coupling mirrors having a reflectivity of 100% and 95 to 99% respectively at the laser wavelength. The totally reflective mirror is, however, transparent to a pump radiation from a pumping laser beam. A narrow pumping beam is permitted to pass through the transparent mirror along a path through the lasing material. The pumping laser beam is absorbed along the path in the laser material developing a population inversion and, hence, a gain along this path. Laser action within the lasing material will occur in this preferred mode, in the direction of the path, resulting in the production of a beam from the solid state lasing material which is scanned or modulated in synchronization with the pumping laser beam. Additionally, an auxiliary lamp may be used to bring the lasing material near threshold.

The method of the present invention provides for controlling the spatial characteristics of the population inversion by utilization of a two-dimensional spatial modulator inserted between the pump beam and the mirror to which it is totally transparent. In this case, the pump beam is broad with respect to the desired output laser beam of the lasing material and is of uniform intensity. The broad pump beam is incident upon the two-dimensional spatial modulator comprising a material in which transmission and/or phase characteristics at various points are modulated by a scanning electron beam incident thereon or other type of modulator. The pumping beam thus modified passes through the modulator and into the laser material where a population inversion is created in which spatial characteristics are determined by the pattern imposed upon the modulator.

Additionally, a spherical lens is inserted between the spatial modulator and the laser material at a position such that the focus of the lens coincides with the centers of two concentric laser resonators in the pumped resonator. The angle at which the pumping laser radiation moves after passing through the spatial modulator depends upon the position of the electron beam on the real time transparency. Since all of the pumped radiation passes through a common point, the focus of the lens in the centers of the reflectors, the center of curvature of the resonator for the pumped laser material can either be positioned between the resonator or external to the resonator. Utilizing a high gain material such as Nd:FAP, large deflection angles are achieved since the length to diameter ratio of the laser material is small.

Optionally, the solid state lasing material can be shaped to have a narrow constriction in the center having a cross-section only slightly larger than the diameter of the aperture pump laser beam at that position. By so configuring the lasing material, all of the directional oscillation modes of the laser share a portion of the active volume of the laser, such that oscillations of one mode suppress oscillation in all of the other modes of the laser. Thus, by applying the pump laser beam to the lasing material prior to excitation therein by a pump lamp, the threshold for the mode parallel to the pump laser beam will be lower than all other modes to provide a pumped laser output oscillation in that mode initially. As the pump lamp power increases above threshold for that mode, it will continue to oscillate alone even though the pump lamp is exciting other regions of the pumped laser material to levels of population inversion which may have given oscillations in other modes had the pump laser beam not initially been present. The full available laser output power of the lasing material having the dimensions defined by the pump laser beam within the pump laser can be obtained along with output scanning capabilities.

3

Other advantages of the present invention will become apparent from a perusal of the following detailed description taken in conjunction with the accompanying drawings.

PRESENTLY PREFERRED EMBODIMENTS

Figure 1:
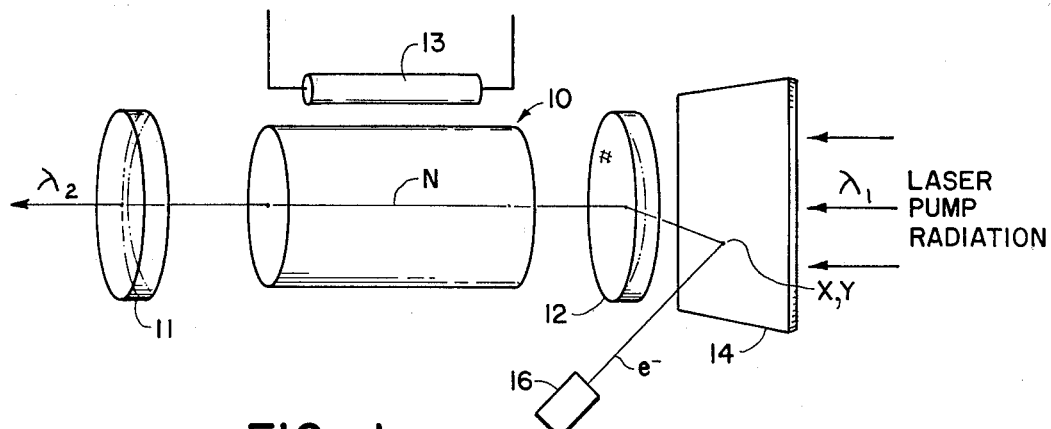
FIG. 1 is an isometric view of a solid state laser rod positioned between a pair of resonator mirrors and including a two-dimensional spatial modulator and electron beam scan.

With reference to FIG. 1, a rod of solid state lasing material, such as Nd:FAP, is positioned between a pair of output coupling or resonating mirrors 11 and 12. Mirror 11 is an output coupling mirror for the lasing material and typically has a reflectivity of between 95 to 99% at the laser wavelength (1.06 microns). Mirror 12, on the other hand, is designed to have a reflectivity of 100% at the output wavelength and is also transparent to pump radiation of beam $\lambda_1$. An auxiliary pumping lamp 13 can be provided to lower the threshold for obtaining laser action along path N of laser rod 10. Positioned adjacent mirror 12 and externally of the resonator cavity is a two-dimensional spatial modulator 14.

With solid state lasing material 10 comprising Nd:YAG or Nd:FAP, for example, and $\lambda_1$ being at 5145A provided, for example, by an argon ion laser, spatial modulator 14 is preferably a thin film consisting of a plate of CdS, the transmission of which at 5145A is modulated by the thermo-optic effect provided by electron beam $e^-$ incident thereon from beam source 16. See Johannes & Vogenthaler, Spatial Modulation in Thin CdS Films, 9 App. Optics 1714 (1970). Alternatively, the spatial modulator can be an Ardenne tube, Titus tube, electro-optic thin plate, acousto-optical grating, or the like. In the thermo-optic case, scanning electron beam $e^-$ can be substituted by a scanning laser beam which has a wavelength well inside the CdS absorption edge. Electron beam $e^-$ locally heats the modulator plate causing a decrease in the modulator plate transmission at the point of contact X, Y. Thus, the region of the laser rod shadowed by this spot will be pumped less strongly and corresponding path N in the laser system will fall below threshold. Therefore, by scanning the electron beam, a suitable pattern is constructed to allow spatial and temporal control of population inversion and laser output. Alternatively, the spatial modulator can be fabricated to permit transmission only at the point of incidence X, Y of the electron beam. By thus providing a point of transmission, a narrow path N is created above threshold along laser rod 10 modulating the spatial and temporal control of the population inversion therealong.

With respect to laser rod 10, the material must not be optically thick with respect to the pumping beam or the entire path length N will not be pumped. In the region of the argon ion laser wavelengths of 4880A and 5145A FAP doped with 0.915 atomic percent Nd is a preferable optical thickness. The transmission of a ⅓ cm slab at 5145A is approximately 80 to 90%. Additionally, the population inversion along N must be sufficiently large to overcome absorption, scattering and output coupling losses so that the pump system will attain threshold. This is actually a requirement on the pumping beam power $\lambda^1$. Thus, for example, a 5 millimeter diameter 37 millimeters long YAG:Nd rod, attains threshold for a CW power of about 3 watts total, actually coupled into the pump bands. Also, to aid in attaining threshold, auxiliary pumping may be used such as lamp 13. Furthermore, while it is generally recognized for both Nd:YAG or FAP laser systems, spatial transfer of excitation is low in normal systems as indicated by the fact that the output drops considerably when the mode volume is decreased. However, it must be recognized that spatial cross-relaxation from excited ions to other ions in the laser crystal volume must be slow enough so that the population inversion generated along path N under steady state conditions is larger than the threshold value.

Figure 2:
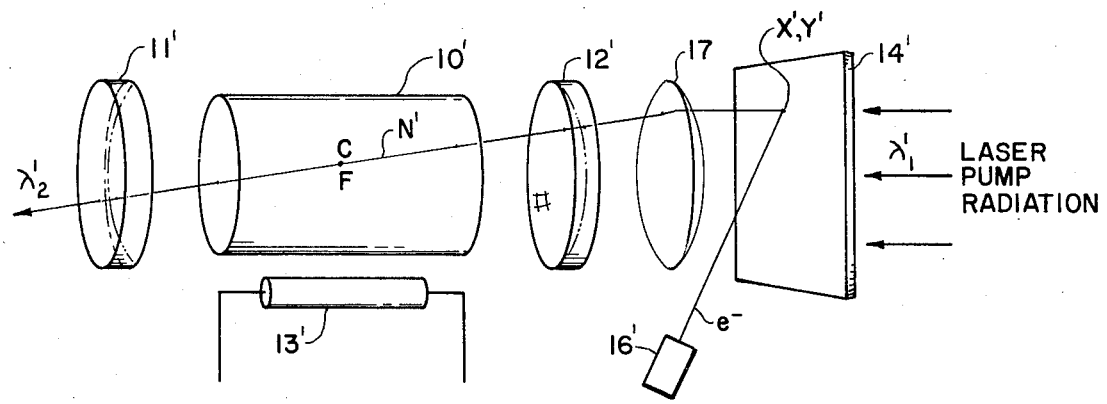
FIGS. 2 and 2A are diagrammatical representations of a solid state laser rod positioned between a pair of resonator mirrors and having a focusing lens positioned between one of said mirrors and the spatial modulator.
Figure 2A:
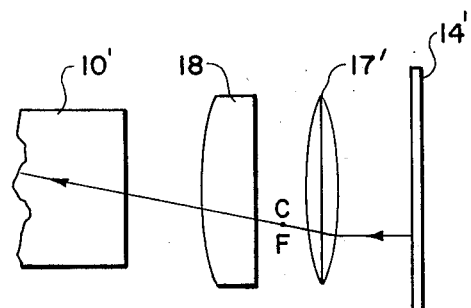

With reference to FIGS. 2 and 2A, a spherical lens 17 is inserted between the spatial modulator 14' and mirror 12' such that the focus F (FIG. 2) of lens 17 coincides with the center C of the two concentric laser resonators 11' and 12' within laser rod 10'. The angle at which the argon laser ray N moves after passing through spatial modulator 14' is dependent upon the position of the transparent spot X'Y' on the real time transparency. All of the rays pass through a common point, viz. the focus of the lens and the center of the reflectors. The center of curvature of the resonator for pump laser material 10' can also be positioned external to the resonator as shown in FIG. 2A. This is achieved by use of a concave resonator mirror 18. Using a high gain material such as Nd:FAP allows large deflection angles to be achieved since the length to diameter ratio of rod 10' is small.

Thus, utilizing spherical lenses 17 or 17' facilitates providing the directional characteristics of the beam in terms of the scanning angle. Moreover, by utilizing a laser pump radiation $\lambda^1$, much higher output power is achieved since the output $\lambda'_2$ is derived from both the pumping laser and the pumped laser material 10'. Generally, the output $\lambda'_2$ must be at a longer wavelength than the pumping laser radiation $\lambda'_1$. However, output wavelengths shorter than the pumped laser (and also possibly shorter than the pumping laser) can be obtained if a harmonic generator material such as barium sodium niobate is used to double the output frequency of the pumped laser material 10'. The harmonic generator is positioned between mirror 11' and laser rod 10' or externally of the laser resonator. Thus, for example, if a harmonic generator is used with an Nd laser material 10' an output of 0.53 microns, i.e. in the green region, can be provided.

Figure 3:
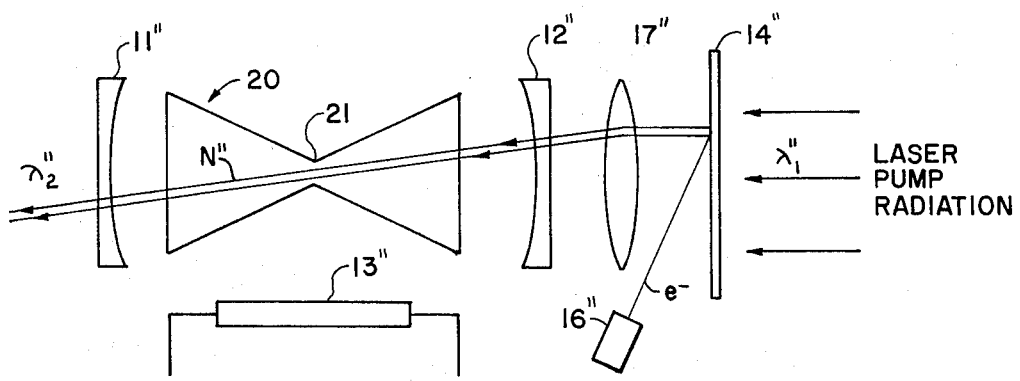
FIG. 3 is another embodiment of the laser device shown in FIGS. 2 and 2A in which the solid state laser material is configured to include a constricted neck portion.

With reference to FIG. 3, laser material 20 is positioned between resonator mirrors 11'' and 12''. Laser material 20 is configured to have a decreasing diameter from both ends of the laser rod to a position central thereof forming a constricted neck portion 21. Neck portion 21 has a cross section only slightly larger than the diameter of the apertured pump laser beam N'' at the central position of laser material 20. By so constricting laser material 20, all of the directional oscillation modes of the laser share a portion of the active volume thereof. Under such conditions, oscillations of one mode will suppress oscillations in all of the other modes of laser material 20. By applying pump laser beam $\lambda_1''$ to laser material 20 prior to excitation by lamp 13'', the threshold for the mode parallel to the pump laser beam $\lambda''_1$ will be lower than all of the other modes providing a pumped laser $\lambda''_2$ along N'' which first oscillates in that mode. As lamp 13'' power increases above the threshold for that mode, it will continue to oscillate alone even though the pump lamp excites other regions of laser material 20 to levels of population inversion which might otherwise have given oscillations in other modes had the pump laser beam $\lambda_1''$ not initially been present. The full available laser output $\lambda_2''$ is thus obtained along with the output scanning capabilities described above.

Lamp 13 can be repetitively pulsed in synchronization with the scanning of a two-dimensional space modulator 14'' to produce any desired angular scan pattern.

While presently preferred embodiments of the invention have been shown and described, it may otherwise be embodied within the scope of the appended claims.

What is claimed is:

1. A method for controlling the spatial and temporal output of a laser oscillator, said method comprising:
    directing a broad area pump laser beam through an end reflector of said oscillator into the laser medium to pump a substantial portion of the height and breadth of said medium for raising said laser above its oscillation threshold,
    positioning a spatial and temporal modulator between said oscillator and said pump laser,
    varying the transmission of the modulator to vary the transmission of the pump laser beam at selected small portions of the beam's cross section for selectively varying the cross sectional portion of said laser medium which is raised above its oscillation threshold by said pump laser beam.

2. A method as set forth in claim 1 includes focusing said modulated beam into said laser material.

3. A method as set forth in claim 1 wherein said step of varying the transmission of said modulator comprises directing an electron beam onto said spatial modulator.

4. A method as set forth in claim 1 wherein said step of varying the transmission of said modulator comprises directing a laser beam onto said spatial modulator.

5. A method as set forth in claim 4 wherein said varying the transmission step includes scanning said spatial modulator with said electron beam.

6. A laser with controlled spatial and temporal output comprising:
    a laser material,
    a resonant optical cavity including optical reflective elements passively terminating each end of said cavity,
    a broad area pump laser beam outside said cavity being positioned and having a cross section to end pump a substantial portion of the height and breadth of said laser material for raising said laser above its oscillation threshold,
    a spatial and temporal modulator positioned between said cavity and said pump laser for varying the transmission of the broad area pump laser beam at selected small portions across the pump beam's cross section for selectively varying the cross section portion of said laser material which is raised above its oscillation threshold by said pump laser beam.

7. The improvement set forth in claim 6 wherein said spatial modulator is selected from the group of modulators consisting of a thermo-optic thin film, electro-optic thin plate, Ardenne tube, Titus tube, acousto-optic grating and acousto-optic scanner.

8. A method as set forth in claim 1 includes auxiliary pumping of said laser material by directing therethrough a light from a flash lamp having a wavelength corresponding to the absorption bands of said laser material to raise the population inversion level close to its threshold value.

9. A laser as set forth in claim 7 further including means for focussing said modulated pump beam into said laser material.

10. A laser as set forth in claim 7 including means for directing an electron beam onto said modulator.

11. A laser as set forth in claim 7 including means for scanning said modulator with said electron beam.

12. A laser as set forth in claim 7 including means for directing a laser beam onto said modulator.

* * * * *